United States Patent Office 3,253,547
Patented May 31, 1966

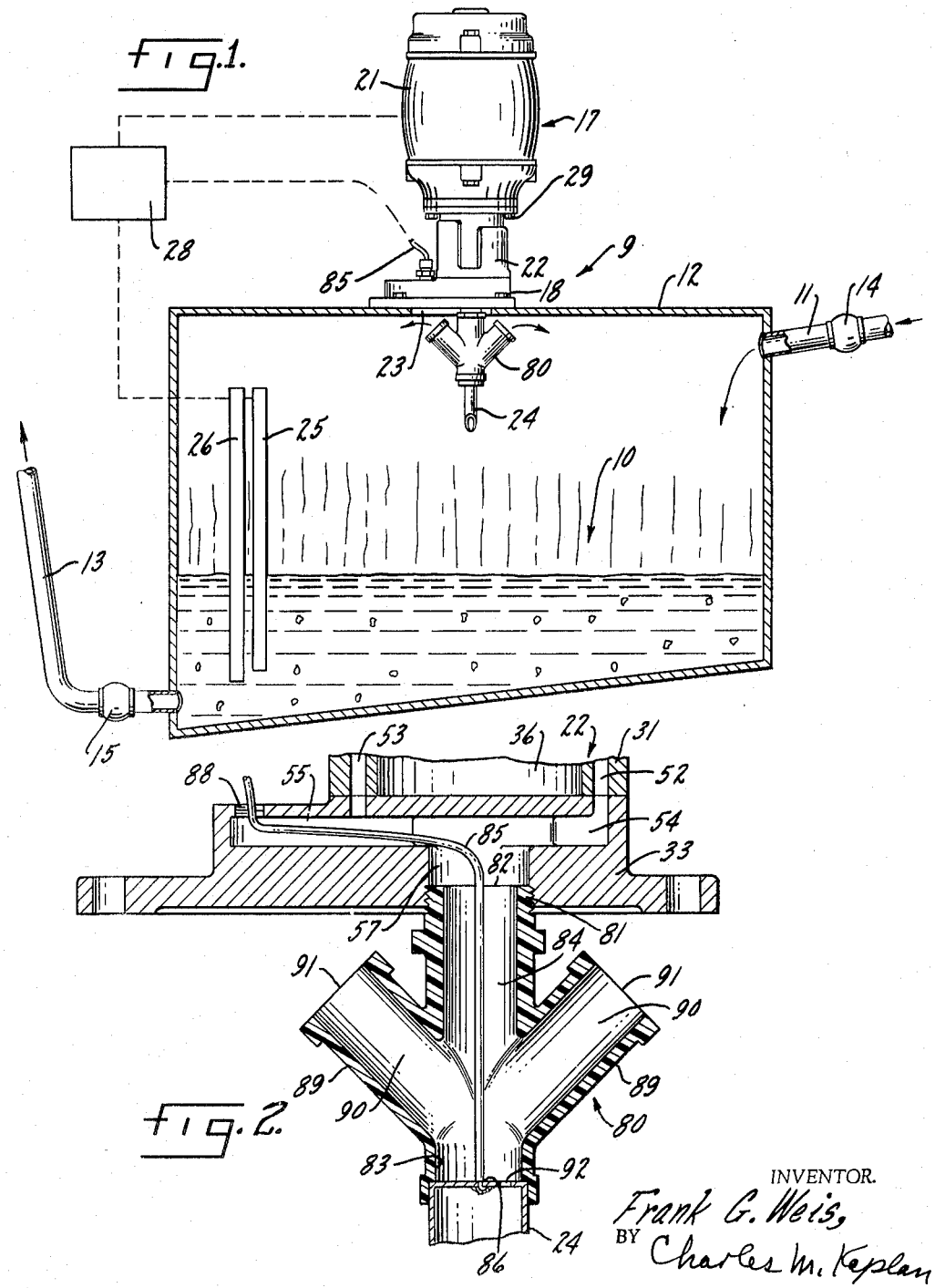

3,253,547
SEWAGE PUMPING SYSTEM
Frank G. Weis, Kansas City, Mo., assignor to Union Tank Car Company, a corporation of New Jersey
Original application Aug. 7, 1963, Ser. No. 300,526. Divided and this application Aug. 24, 1964, Ser. No. 391,365
4 Claims. (Cl. 103—25)

This is a division of Serial No. 300,526, filed August 7, 1963, and assigned to the same assignee as this application.

This invention relates to sewage pumping systems employing improved means for preventing the fouling of electrical elements in a control circuit therefor.

It is an object of the invention to provide a sewage pumping system in which insulating means supporting an electrical element in a control circuit directs the flow of air away from such electrical element.

Still another object is to provide an improved insulator for an electrode in the control circuit of a sewage pumping system, such electrode serving as the port through which flow gases that eject the sewage.

A further object is to combine a gas discharge means and an electrical insulator into a device that prevents discharged gas from splashing undesirable matter on an electrode held by the insulator.

Other objects and advantages of the invention will be apparent from the drawing, specification, and claims, and the scope of the invention will be pointed out in the claims.

Briefly stated, according to one aspect of the invention, means for producing gas pressure or vacuum has its operation controlled by electrical means including an electrical element. A generally hollow body of electrical insulating material defines means for insulating the electrical element from the gas pressure or vacuum producing means, and passages in such body define conduit means for receiving moving gas and directing such moving gas away from the electrical element.

In the drawing:

FIG. 1 is a schematic, partially cross sectional view of an embodiment of the invention.

FIG. 2 is an enlarged, partly broken away, cross sectional view showing the interior of the gas flow directing insulator.

Referring to the drawing, FIG. 1 shows a system 9 for pumping sewage 10 in accord with the teachings of the invention. A sewage inlet pipe 11 is connected adjacent the upper end of a sewage receiving chamber or tank 12, and a sewage outlet pipe 13 is connected adjacent the bottom of tank 12. A conventional check valve 14 in pipe 11 permits sewage to flow into tank 12 but not out of tank 12, and a similar check valve 15 in pipe 13 permits sewage to flow out of tank 12 but not into tank 12.

A combined motor compressor unit 17 for pumping sewage is attached to tank 12 by bolts 18. The unit 17 comprises a conventional reversible electric motor 21 connected to a suitable source of electric power and a reversible gas compressor 22. Compressor 22 communicates with the interior of tank 12 through a hole 23 so that it can withdraw air therefrom as sewage is flowing into tank 12 or compress air thereinto to eject the sewage.

When the system starts up, tank 12 is empty and compressor 22 runs in a direction that withdraws air therefrom. When the sewage level in tank 12 reaches a predetermined high level determined by a hollow, open-ended electrode 24, motor 21 is caused to reverse and thereby run compressor 22 in a direction that compresses air into tank 12. As air pressure builds up in tank 12, it forces the accumulated sewage out through pipe 13. When the sewage recedes to a predetermined low level determined by the electrodes 25 and 26, motor 21 stops.

The electrodes 24–26 may be interconnected in any sewage ejector electrical control circuit 28 known to the art, it being understood that the specific details of such a circuit form no part of the present invention.

Turning now to FIG. 2, hollow electrode 24 is shown connected to compressor 22 by a unitary insulator-nozzle element 80, which is made from a suitable corrosion resistant electrical insulating material, such as polyethylene. Threaded end 81, which has a first opening 82, screws into opening 57 in base 33, and the closed end of electrode 24 is secured by any suitable means in a second opening 83 at the other end of the element 80. Openings 82 and 83 are connected by a first passage 84. An insulated electrical conductor 85 is soldered to electrode 24 at 86. Conductor 85 passes through first passage 84 which defines first air conduit means, opening 57, passage 55 in base 33, and finally out through an opening 88, and is then connected into motor control circuit 28.

One or more air discharging conduits 89 are defined by second passages 90 which intersect first passage 84. Conduits 89 project outwardly from element 80, and their discharge ports 91 are oriented to expel air from compressor 22 upwardly toward the top of tank 12 and away from electrode 24. When compressor 22 is evacuating tank 12, conduits 89 draw air into compressor 22 from adjacent the top of tank 12 and thus reduce the amount of solid and liquid material drawn into the compressor. A drain hole 92 may be provided in the closed end of hollow electrode 24 to enable moisture that condenses in compressor 22 or element 80 to drain through the open end of the electrode into tank 12. The drain 92 should be small enough to prevent any significant amount of air from being discharged therethrough.

Heretofore, in sewage ejectors the practice has been to force air through a conduit or a hollow electrode that expels the air downwardly towards the sewage. This caused splashing of sewage upwardly onto electrode 24 when the sewage is at or near its highest level. The result was that electrode 24 often became so covered with crud that it was rendered inoperative with a consequent failure of the sewage pumping system. The combined insulator-conduit element 80 solves this problem by expelling air in a direction that prevents splashing of sewage.

It will be understood that while the form of the invention herein shown and described constitutes a preferred embodiment, it is not intended herein to illustrate all of the equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What is claimed is:

1. The combination comprising:
   (A) means for producing gas pressure or vacuum;
   (B) electrical means for controlling operation of the first mentioned means including an electrical element and an electrical conductor connectable to said electrical element; and
   (C) means for electrically insulating said electrical element from said first mentioned means and also for directing the flow of gas moved by said first mentioned means comprising a generally hollow body of electrical insulating material defining:
      (1) a first passage defining first conduit means having an opening at one end for receiving said electrical conductor, and an opening at the opposite end for receiving said electrical element, said conductor passing through said first passage and being connected to said electrical element, (2) a second passage defining second conduit means communicating with said first conduit means and terminating in a gas discharge port oriented to direct gas away from said opening that receives said electrical element, and (3) said opening at one end of said first passage being the gas intake port for said second conduit means.

2. The combination comprising:
(1) gas discharging means;
(2) electrical means for controlling operation of said gas discharging means including:
   (a) conductor means, and
   (b) electrode means; and
(3) means for electrically insulating said electrode from said gas discharging means and also for directing the flow of gas expelled by said gas discharging means comprising:
   (a) a body of electrical insulation having a first passage defining first conduit means coupled at one end to a discharge port of said gas discharging means and receiving said electrode at the other end,
   (b) said conductor entering said one end, passing through said first passage, and being connected to said electrode, and
   (c) a second passage in said body defining second conduit means communicating with said first conduit means and terminating in a gas discharge port oriented to direct gas away from said electrode.

3. A sewage pumping system comprising:
(1) a sewage tank having a sewage inlet and a sewage outlet; said tank containing liquid sewage,
(2) compressor means supported above said tank for forcing air into said tank to eject sewage therefrom,
(3) electrical means for controlling operation of said compressor means including an electrode extending downwardly into said tank for sensing the level of said sewage, and an electrical conductor passing through said tank and connected to said electrode,
(4) a unitary insulator for said electrode and air flow directing means for said compressor means comprising a body of electrical insulating material having a first opening coupled to a discharge port of said compressor means,
(5) said electrode being supported by said body,
(6) a first passage in said body defining first air conduit means communicating with said first opening and said electrode,
(7) said conductor passing through said first passage, and (8) a second passage in said body defining second air conduit means communicating with said first air conduit means and terminating in a gas discharge port oriented to direct compressed air upwardly toward the top of said tank and away from said sewage, whereby splashing of sewage on said electrode by air discharged by said compressor means will be prevented.

4. The combination comprising:
(1) gas discharging means;
(2) electrical means for controlling operation of said gas discharging means including:
   (a) conductor means, and
   (b) a hollow, open-ended electrode; and
(3) a unitary element for electrically insulating said electrode from said gas discharging means and directing the flow of gas expelled by said gas discharging means comprising:
   (a) a body of electrical insulation having a first passage defining first conduit means coupled at one end to a discharge port of said gas discharging means and receiving a closed end of said electrode at its other end,
   (b) said conductor entering said one end, passing through said first passage, and being connected to said closed end of said electrode,
   (c) a second passage in said body defining second conduit means communicating with said first passage and terminating in a gas discharge port oriented to direct gas away from said electrode, and
   (d) there being a small hole in said closed end of said electrode for draining moisture out of said element through the open end of said electrode.

References Cited by the Examiner

UNITED STATES PATENTS

| | | | |
|---|---|---|---|
| 2,303,716 | 12/1942 | Amdt | 103—25 |
| 2,412,723 | 12/1946 | Ellicott | 103—241 |
| 2,434,027 | 1/1948 | Whittington | 103—225 |
| 2,463,703 | 3/1949 | Legler | 103—25 |
| 2,645,749 | 7/1953 | Laleino | 318—482 |
| 2,817,299 | 12/1957 | Weis | 137—392 |
| 2,910,940 | 11/1959 | Calman et al. | 103—25 |
| 3,091,252 | 5/1963 | Jones | 137—392 |

FOREIGN PATENTS 48,680   2/1938   France.

SAMUEL LEVINE, *Primary Examiner.*

DONLEY J. STOCKING, *Examiner.*

W. L. FREEH, *Assistant Examiner.*